United States Patent [19]

Edgington et al.

[11] Patent Number: 5,530,804
[45] Date of Patent: Jun. 25, 1996

[54] SUPERSCALAR PROCESSOR WITH PLURAL PIPELINED EXECUTION UNITS EACH UNIT SELECTIVELY HAVING BOTH NORMAL AND DEBUG MODES

[75] Inventors: Gregory C. Edgington, Scottsdale; Joseph C. Circello; Daniel M. McCarthy, both of Phoenix; Richard Duerden, Scottsdale, all of Ariz.

[73] Assignee: Motorola, Inc., Schaumburg, Ill.

[21] Appl. No.: 242,767

[22] Filed: May 16, 1994

[51] Int. Cl.[6] .................................................. G06F 11/26
[52] U.S. Cl. .................... 395/183.06; 395/500; 395/800; 395/550
[58] Field of Search .......................... 395/500, 575, 395/700, 800, 183, .06, 550

[56] References Cited

U.S. PATENT DOCUMENTS

| | | | |
|---|---|---|---|
| 4,787,031 | 11/1988 | Karger et al. | 395/800 |
| 4,924,382 | 5/1990 | Shouda | 395/700 |
| 5,193,181 | 3/1993 | Barlow et al. | 395/181 |
| 5,210,864 | 5/1993 | Yoshida | 395/183.13 |
| 5,249,266 | 9/1993 | Dye et al. | 395/162 |
| 5,313,618 | 5/1994 | Pawloski | 395/500 |
| 5,321,828 | 6/1994 | Phillips et al. | 395/500 |
| 5,410,685 | 4/1995 | Banda et al. | 395/183.14 |

*Primary Examiner*—Ken S. Kim
*Attorney, Agent, or Firm*—Keith E. Witek

[57] ABSTRACT

A processor (10) has two modes of operation. One mode of operation is a normal mode of operation wherein the processor (10) accesses user address space or supervisor address space to perform a predetermined function. The other mode of operation is referred to as a debug, test, or emulator mode of operation and is entered via an exception/interrupt. The debug mode is an alternate operational mode of the processor (10) which has a unique debug address space which executes instructions from the normal instruction set of the processor (10). Furthermore, the debug mode of operation does not adversely affect the state of the normal mode of operation while executing debug, test, and emulation commands at normal processor speed. The debug mode is totally non-destructive and non-obtrusive to the "suspended" normal mode of operation. While in debug mode, the existing processor pipelines, bus interface, etc. are utilized.

42 Claims, 10 Drawing Sheets

SUPERSCALAR PROCESSOR WITH PLURAL PIPELINED EXECUTION UNITS EACH UNIT SELECTIVELY HAVING BOTH NORMAL AND DEBUG MODES

FIELD OF THE INVENTION

The present invention relates generally to data processing systems, and more particularly, to test, debug, and emulation modes in a data processing system.

BACKGROUND OF THE INVENTION

Various approaches have been taken in previous microprocessor designs to implement functionality that supports utilization of in-circuit emulators and other test equipment to debug and test microprocessor-based systems. Those implementations have provided certain controllability and observability features, but at the expense of additional transistors and package pins to provide those features (thus, extra silicon area, extra cost), and limitations in the operational frequency of the microprocessors while utilizing these debug features. In other words, in-circuit emulators to date have either been expensive, costly in terms of substrate area and/or pin count, only operable at frequencies which are slower than the normal speed of the processor, etc..

Motorola DSP56000 products include an On-Chip Emulation (OnCE) capability. OnCE provides an emulator with debug capabilities (for example, read and write internal registers, restart processor) to utilize in systems built around a DSP56000 device. The OnCE implementation strictly depends on a serial interface for communication between the in-circuit emulator and the DSP56000, operates at much less than full frequency of the part (⅛ frequency maximum), and requires dedicated pins on the DSP which then requires a larger package size.

Motorola CPU32 products have included Background Debug Mode (BDM), an internal debug mode implemented in microcode on these processors. BDM provides debug options such as viewing and/or altering internal registers, read or writing memory, and resetting peripherals. The BDM implementation also strictly depends on a serial interface for communication between the in-circuit emulator and the CPU32, operates at much less than full frequency of the part (½ frequency maximum), and requires dedicated pins on the microprocessor.

There have been examples of separate, operational extensions that have been implemented to microprocessor architectures external to the processor. These extensions have focused on expanding the capabilities of internal microprocessor software (i.e., operating systems) in the areas of system power reduction.

The System Management Mode (SMM) feature on various x86 microprocessors (386, 486, Pentium) from Intel, AMD, and Chips and Technologies, is an implementation of a separate, operational extension to the x86 microprocessor architecture, directed toward system power management and not to in-circuit emulation, testing, and debug operations.

SUMMARY OF THE INVENTION

The previously mentioned disadvantages are overcome and other advantages achieved with the present invention. In one form, the present invention comprises a data processing system. The data processing system having a central processing unit (CPU). The CPU having both (1) a normal mode of operation wherein a user programming model and user address space are accessed to perform a predetermined function and (2) a debug mode of operation wherein a debug address space different from the user address space is accessed to perform another predetermined function. The normal mode of operation executes instructions which are fetched from the user address space at a predetermined rate and the debug mode of operation executes instructions which are fetched from the debug address space at a rate substantially equal to the predetermined rate.

Figure 1:
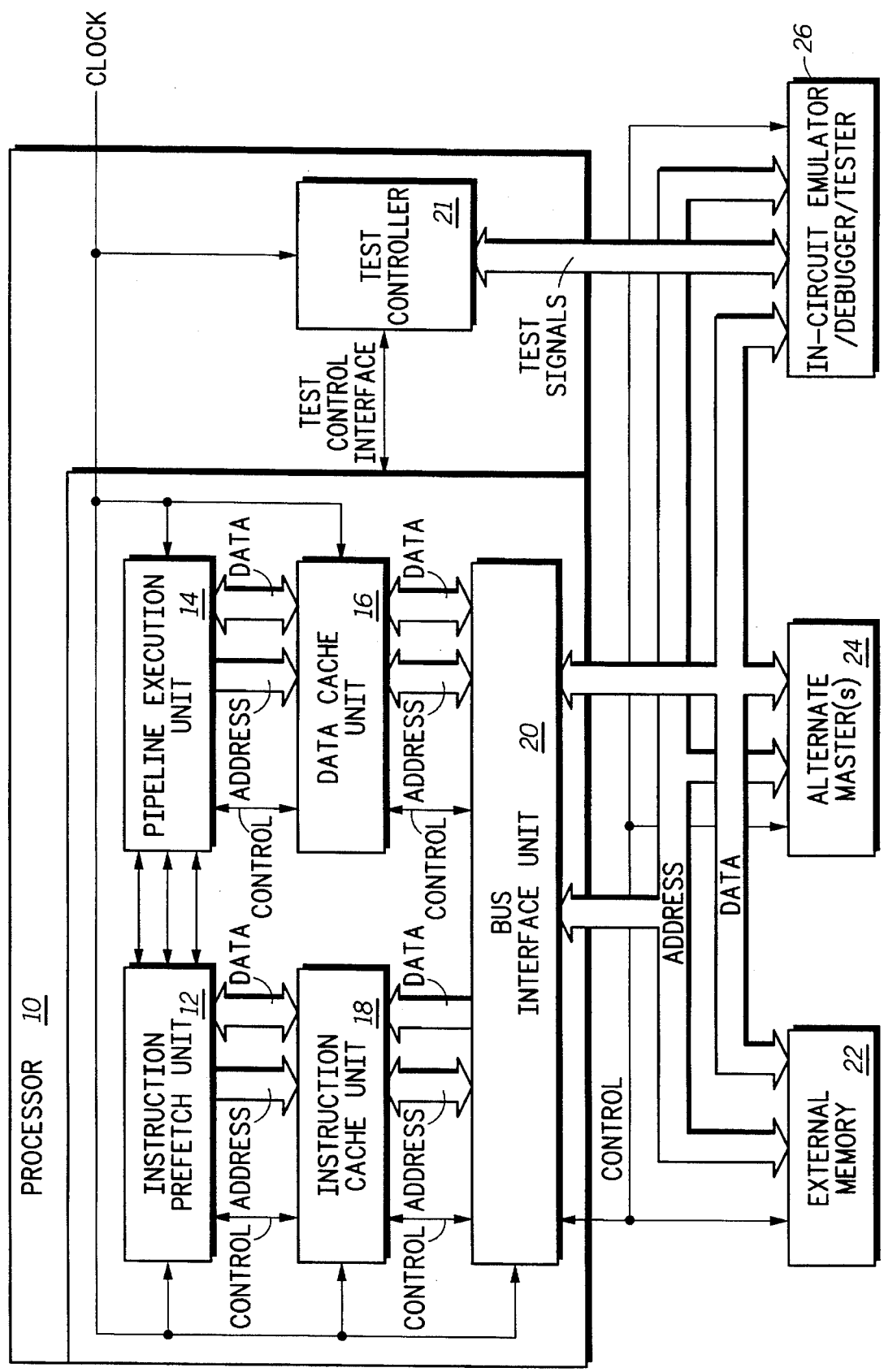
FIG. 1 illustrates, in a block diagram, a data processing system in accordance with the present invention.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

Generally, the present invention provides a data processing system with an architectural extension which allows the data processor to perform extensive testing, debug, and in-circuit emulation utilizing existing data processor resources (such as the existing bus interface, existing instruction pipelines, etc.). The architectural extension for debugging and emulator support is implemented as an alternate operational mode of the data processor. This alternate operational mode accesses a unique debug/test address space in system memory which is different from an address space accessed in the processor's normal mode of operation. The alternate operational mode is identified external to the processor by setting transfer attributes bus bits (which have access to pins or terminals external to the processor) to a predetermined value.

While in the debug/test/emulator mode, the processor executes instructions from its existing instruction set. These instructions will, in the debug/test/emulation mode, control test and debug operations including any exiting from the debug/test/emulation mode. It is important to note that existing processor hardware is used by the debug/test/emulation mode. The debug/test/emulation operational mode of the processor is non-destructive and non-obtrusive to the "suspended" normal system environment or state. In addition, when in the debug/test/emulation mode of the processor, the processor executes instructions at the full operating clock frequency of the processor unlike other known test modes.

In addition, the data processing system provides entry into the debug/test/emulation mode via a generate debug mode interrupt (GDMI) invoked through a GDMI command, execution of a trace or breakpoint, or an external reset. Exit from the test mode is accomplished via an RTE (return from exception) instruction. While in the test mode, various resources of the processor (such as the branch cache, interrupts, and some normal mode instructions) may be disabled or ignored. A MOVES instruction (move alternate space instruction) may be used to access the normal address space of the processor when in the test/debug/emulator mode, using normal address translation and cache access, if such access is required.

The following pipeline design control features define a possible set of functions which may be implemented or manipulated via a pipeline control hardware debug interface while in the aforementioned test/debug/emulation mode:

(1) Processor configurations can be "override disabled" superseding control register contents. For example, a program control register (PCR), a cache configuration register (CACR), a translation control register (TC) which include various configuration controls (i.e., enable/disable bits) for the processor may be overridden while in the test/debug/emulation mode of operation.

(2) Certain cache and address translation cache (ATC) control operations may be inserted into the processor pipeline for execution in the aforementioned test mode. Such instructions include the cache invalidate (CINV), cache push (CPUSH), and paged memory management unit flush (PFLUSH).

(3) A non-pipelined execution mode can be set and reset while in the debug/test/emulation mode. In the non-pipelined mode of operation, the processor can dispatch one instruction to one pipeline or dispatch one unique instruction to each pipeline execution unit (when using two or more pipeline execution units). Subsequent instructions are not dispatched to the pipeline(s) until the previously dispatched instruction(s) exit the pipeline (the pipelined execution unit enters a stalled state wherein no other dispatch occurs while the previously dispatched instructions are being executed).

(4) A hardware "single-instruction step" mode can be set or reset. In this mode, one instruction is executed at a time through a pipeline execution unit. After the execution of the one instruction, processor status outputs are set to indicate that the processor has completed one instruction and the processor is halted (i.e., performs no more instruction executions) until a user restarts the processor.

(5) When the processor is "halted" as discussed above, any debug command can be sent to the processor to check or alter processor state information and the like. Execution of instructions can be resumed by ending the "halted" state via receipt of a restart command. The halted state may be entered in one of many ways discussed herein.

(6) All outputs of the processor may be driven to a high impedance state and all inputs ignored so that an in-circuit emulator has control of the microprocessor pins/terminals in order to allow the initiation of bus cycles.

The present invention overcomes many of the disadvantages stated above and can be more fully understood with reference to the FIGS. 1–12 herein. FIG. 1 generally illustrates a data processor 10 with an external bus (including address, data, and control information) connected to external memory 22 and other optional external bus masters 24 which may be similar to processor 10. The processor 10 has an instruction prefetch unit 12 which fetches processor instructions which are stored in an instruction cache 18. A pipeline execution unit 14 is used to execute instructions fetched by the unit 12. A bus interface unit (BIU) 20 is used to access external memory 22 to provide a stream of instructions and data from the external bus to the cache units 16 and 18. A test controller 21 controls the test and debug functionality of the data processor 10 through test control interface signals. The "CLOCK" input is a synchronous clock signal used by all modules in the data processor 10. An in-circuit emulator/debugger/tester 26 can be connected to the external "address", "data", and "control" buses of the data processor 10 to observe and/or control operation of data processor 10. The external address and control buses contain all components that make up the complete physical address used by the data processor (address bits, transfer type bits, transfer modifier bits, etc.). The in-circuit emulator/debugger/tester 26 can exercise a powerful group of control functions through its connection to the test controller 21 via the "test signals" interface.

Figure 2:
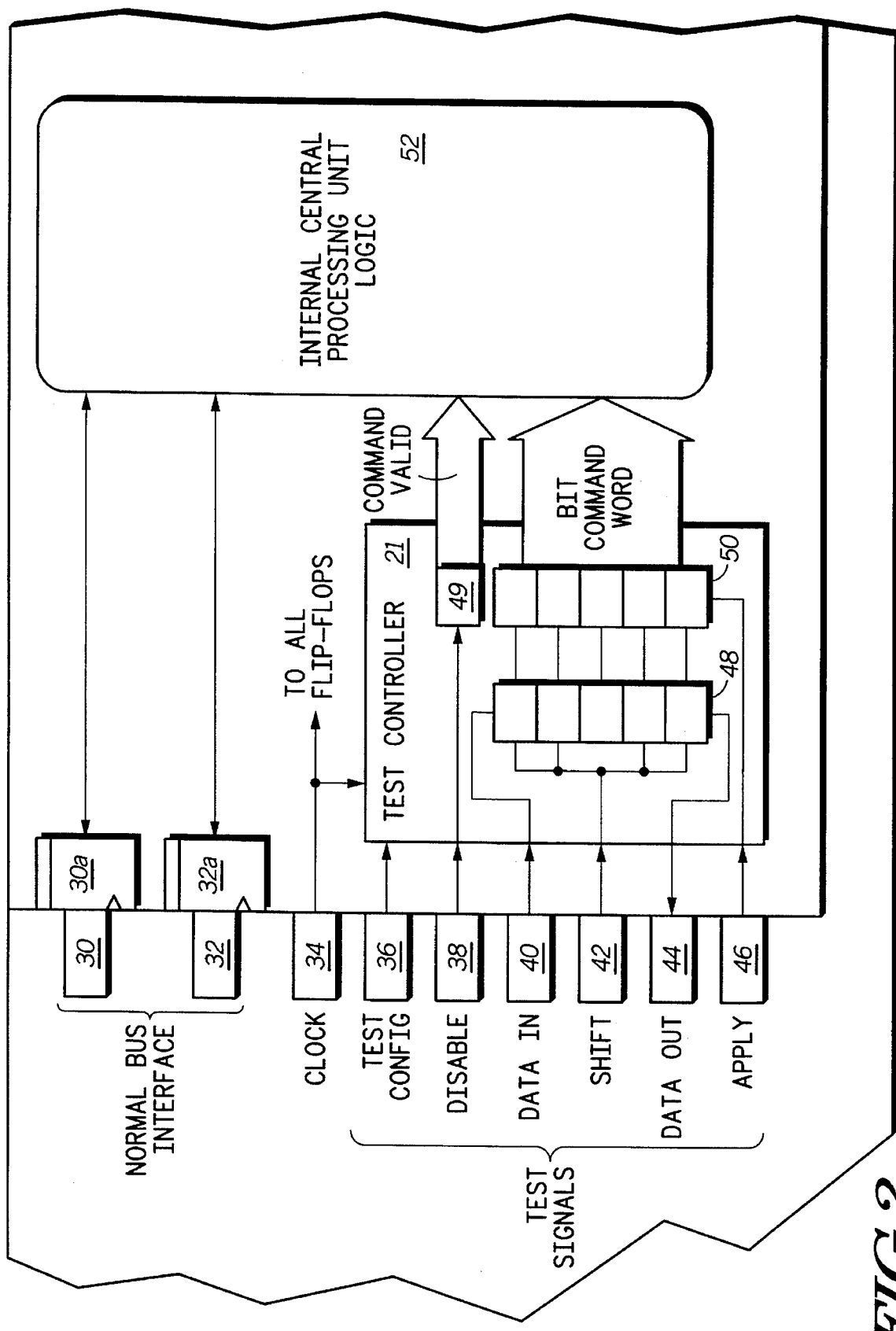
FIG. 2 illustrates, in a block diagram, the test controller of FIG. 1 in accordance with the present invention.

FIG. 2 illustrates a circuit portion of the data processing system of FIG. 1. FIG. 2 illustrates in more detail the test controller 21 from FIG. 1 and many test interfaces both external and internal to the data processor 10 of FIG. 1. The CLOCK signal of FIG. 2 is the same CLOCK signal illustrated in FIG. 1. The Normal Bus Interface of FIG. 2 includes the address, data, and control buses of FIG. 1. The pins/terminals 36, 38, 40, 42, 44, and 46 of FIG. 2 are analogous to the test signals of FIG. 1. The Command Valid and Bit Command Word are analogous to the Test Control Interface of FIG. 1.

Test controller 21 operation in debug/emulator mode is controlled largely by pins/terminals 30–46:

Pins 30 and 32 depict normal bus interface pins to the data processor 10, implementing inputs, outputs, and bi-directional signals for data, address, and control information. In other words, pins 30 and 32 represent a plurality of external terminals of processor 10 which allow for external communication via the control, address, and data buses of FIG. 1. The signals through the pins 30 and 32 are bi-directional or unidirectional depending upon the function performed, and are, in some cases depending upon functionality, latched in D flip-flops or equivalent storage devices as indicated via the elements 30*a* and 32*a*. Typically address buses and data buses run 8 bits, 16 bits, 24 bits, 32 bits, or 64 bits wide although other sizes are possible. Therefore, pins 30 and 32 are representative of not simply two pins but tens or hundreds of pins. Control information from the control bus may be one bit or several bits depending upon the complexity of processor 10.

Pin 34 is a synchronous clock signal used by all modules of the data processor (including the test controller 21). The signal input via pin/terminal 34 is the same CLOCK signal of FIG. 1.

Pin 36 is a "test configuration" signal, which determines whether pins 38–46 are operating in debug/emulator mode or if they are operating in another test mode. In general, the pins 38–46 can be "multiplexed" to serve more than one purpose each at different times via the state of the pin 36. Pin 36 is optional if pins 38–46 are dedicated pins used only to support one function each. Pin 36 may be one bit or several bits depending upon the number of test modes supported by the processor 10.

Pin 38 is a debug/emulator command "enable" or "disable" signal, communicating when any debug command is valid. The disable or enable signal from pin/terminal 38 is latched or stored in a location 49 to provide one or more command word valid signal(s).

Pin 40 is a "data in" signal, used as the input data to a serial shift register 48. Binary bits are shifted into register 48 one bit at a time through the pin/terminal 40.

Pin 42 is a "shift" control signal, used to control the function of shifting the contents of the serial shift register 48 by one position. When the "shift" signal is asserted, the value of the data in pin 40 is loaded into the least significant bit of serial shift register 48, moving the contents of each bit of register 48 to its next most significant position in register 48, and dropping the most significant bit of the register to the data out pin 44.

Pin 44 is a "data out" signal, driving the contents of the most significant bit of the serial shift register 48 out of the data processor 10 for potential examination via the test 26 of FIG. 1 or another device external to the processor 10.

Pin 46 is an "apply" signal, which when asserted transfers the contents of the serial shift register 48 into a parallel command register 50.

Serial shift register 48, parallel command register 50, and a command valid register 49 are contained in the test controller 21 of FIGS. 1 and 2. Serial shift register 48 is a preferred five bits in size, parallel command register 50 is a preferred five bits in size, and command valid register 49 is a preferred one bit in size, although any other size is possible for any of the registers in test controller 21. When the command valid register 49 signals a valid command, an internal central processing unit logic 52 receives a valid 5-bit command word from the parallel command register 50, decodes it into one of 28 possible commands from the 32 possible bit patterns (i.e., $2^5$=32), and performs the command function. In general, up to 32 commands can be represented via the 32 possible bit patterns from the five bit registers 48 and 50, but in one form, the processor only uses 28 of the 32 possible bit patterns to provide 28 total functions. Any serial interface may be used instead of the serial shift register 48 and corresponding interface discussed herein.

It is important to note that the internal central processing logic 52 of FIG. 2 is made up of all modules of the data processor 10 of FIG. 1 except for the test controller 21. In other words, the logic of FIG. 2 includes the bus interface unit 20, cache units 16 and 18, instruction prefetch unit 12 and pipeline execution unit 14. As indicated above, in a preferred form, twenty-eight command types can be shifted into the data processor through the debug/emulator mode test controller interface. These 28 commands are listed below:

restart the processor 10 (also referred to as the CPU).

halt the CPU.

enable use of pulse instruction to set/reset non-pipeline mode of operation.

disable all non-pipeline, single-step modes.

enable single-step pipeline mode.

enable non-pipeline mode allowing superscalar dispatches.

enable non-pipeline mode inhibiting superscalar dispatches.

force "cache invalidate all" into the pipeline execution unit to invalidate all entries in the instruction cache 18.

force "cache invalidate all" into the pipeline execution unit to invalidate all entries in the data cache 16.

force "cache push all" into the pipeline execution unit to push all modified data from both the instruction cache 18 and the data cache 16 to memory 22.

force "cache push all" into the pipeline execution unit to push all modified data from the data cache 16 to the memory 22.

force "PMMU (paged memory management unit) flush all" into the pipeline execution unit to entirely flush all cached entries in the memory management units located within the instruction cache unit 18 and the data cache unit 16.

force all output pins/terminals to high impedance.

release all output pins/terminals from high impedance.

reset all the debug disable control bits.

disable Instruction Cache 18.

disable Data Cache 16.

disable Instruction Cache TLB (translation look-aside buffer). A TLB is conventionally used when translating a logical address to a physical address and is analogous to an address translation cache (ATC) as used herein.

disable Data Cache TLB translation look-aside buffer).

disable Write Buffer. The write buffer is used to write cache information to memory 22 in an imprecise manner (i.e. it is a queue for external memory writes to memory 22).

disable Branch Cache (BC). A BC is a conventionally known element which "predicts" branching in a CPU and stores information which speeds branch processing.

disable Floating Point Unit (FPU). FPU is a known structure in the art used to perform floating point operations on floating point numbers.

disable superscalar dispatches in the unit 14.

disable all trace/breakpoint entries.

enable debug/emulator mode entry on breakpoint.

enable debug/emulator mode entry on trace.

enable debug/emulator mode entry on trace or breakpoint.

generate debug/emulator mode interrupt.

These commands can all be categorized as providing one or more of the following capabilities:

1. To halt or restart (remove halt condition) the data processor 10.

2. To configure certain processor instruction types to perform additional and/or alternate functions.

3. To enable or disable certain debug/emulator states in the data processor 10.
4. To override or disable certain processor configurations or supersede control register contents.
5. To force certain cache and ATC (address translation cache—which is used in a paged memory management unit (PMMU) to translate logical addresses to physically addresses) control operations into the data processor 10 pipeline for execution.
6. To force data processor 10 into and out of a state where all outputs are to be driven to a high impedance state and all inputs are ignored.
7. To directly initiate a generate emulator interrupt command, resulting in entry to debug/emulator mode.

The following will summarize the sequence in which debug/emulator mode commands are loaded and applied to the data processor:

1. When the test configuration pin 36 is configured to debug/emulator mode, serial shift register 48 can be loaded with 5-bit debug/emulator commands via data input through the data in pin 40 and shifted through the register by the shift pin 42.
2. When the 5-bit value is loaded, apply pin 46 will be asserted to load serial shift register 48 contents into the parallel command register 50.
3. The command valid register 49 captures the value of enable pin 38. When the command valid register 49 contents signal "valid", the 5-bit parallel command register 50 contents are interpreted as a valid debug/emulator mode command by the internal central processing unit logic 52.

In general, FIG. 2 illustrates a manner for shifting control operations into the processor 10 during a test mode or to initiate a test mode. Therefore, test controller 21 is used and useful during the aforementioned test/debug/emulation mode.

Figure 3:
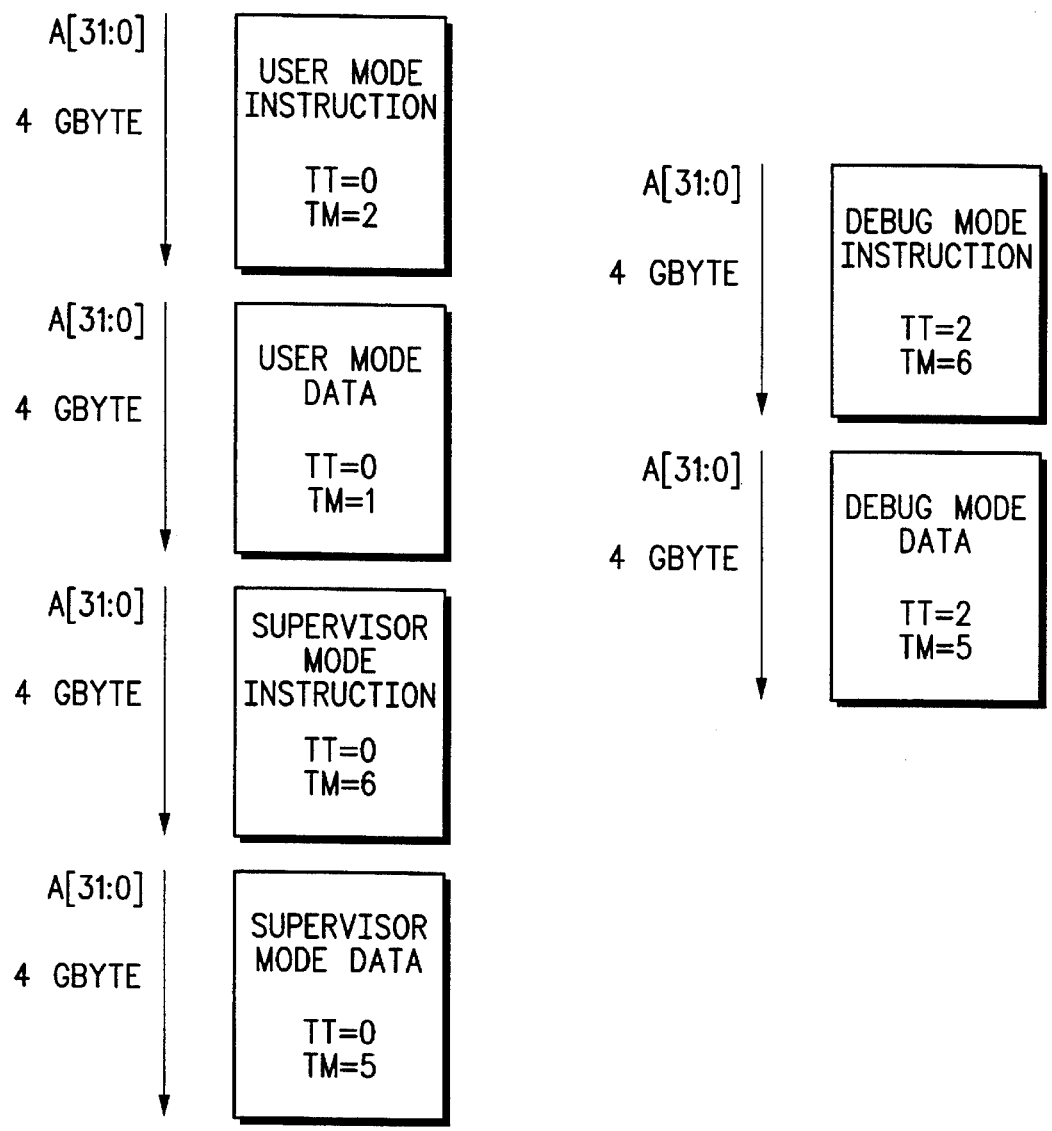
FIG. 3 illustrates, in a block diagram, a memory map of the external memory of FIG. 1 in accordance with the present invention.

FIG. 3 illustrates a memory map of the data processing system of FIG. 1. The memory map indicates how the memory 22 (or a plurality of memories either internal and/or external to processor 10) of FIG. 1 is parsed and accessed. FIG. 3 illustrates the data processing system physical address map for the external memory 22 of FIG. 1, based on user and supervisor operational modes, instruction and data address spaces, and FIG. 3 demonstrates how the system architecture and addressing space has been extended to implement a debug mode as an architectural extension.

FIG. 3 contains six physical address spaces having a maximal size of 4 Gbytes (although other sized memory spaces are possible). The six physical address spaces are indexed by address bus bits from FIG. 1 referred to as A[31:0]. A 2-bit control bus field Transfer Type (TT[I:0]) and a 3-bit control bus field Transfer Modifier (TM[2:0]) define the six different 4-Gbyte address spaces via the control bus of FIG. 1. User mode defines an operational mode of the data processor 10 that has a privilege level where most application code can accomplish work. Supervisor mode operation requires a higher level of privilege and has a broader range of access to control functions of the data processor 10. Data processor memory space is additionally subdivided into an instruction address space, which contains the sequence of operations that make up a program for execution, and a data address space that contains the operands that are used and manipulated during execution of the instruction sequence. As defined in this application, debug/emulator/test mode is an additional operational mode for the data processor, with its own instruction and data address spaces, for support of debug/emulator/test capabilities. Therefore, the debug/emulator/test mode will not damage or disrupt the user mode address space or the supervisory mode address space when invoked and operated.

The TT[I:0] control bus signals of FIG. 1 indicate the type of access being made to the address on the address lines. The four valid TT[I:0] encodings are:
TT=0, Normal Access;
TT=1, Special Move of 16 bytes operation;
TT=2, Alternate Logical Function Code Access;
TT=3, Acknowledge Access.

The TM[2:0] control bus signals of the control bus of FIG. 1 give supplemental information to the TT[I:0] bits about the access being made to the address being provided on the address bus of FIG. 1. The valid TM[2:0] encodings for TT=0 and TT=2 are: TT=0
TM=0, Data Cache Push Access
TM=1. User Mode Data Access
TM=2. User Mode Instruction Access
TM=3, PMMU Tablewalk Data Access
TM=4, PMMU Tablewalk Instruction Access
TM=5, Supervisor Mode Data Access
TM=6, Supervisor Mode Instruction Access
TM=7, {reserved}
TT=2
TM=0, Logical Function Code 0
TM=1, "Idle Bus Access"
TM=2, {reserved}
TM=3, Logical Function Code 3
TM=4, Logical Function Code 4
TM=5, Debug/Emulator/Test Mode Data Access
TM=6, Debug/Emulator/Test Mode Instruction Access
TM=7, Logical Function Code 7

A designer utilizing the debug/emulator/test mode would structure a system such that it responds to accesses to debug/emulator/test mode instruction space with instructions to be executed in debug/emulator/test mode and to debug/emulator/test mode data accesses with operand data to be manipulated by the debug/emulator/test mode instructions, just as a programmer would utilize user mode instruction space for programs and user mode data space for operand data accessed by other application programs.

Figure 4:
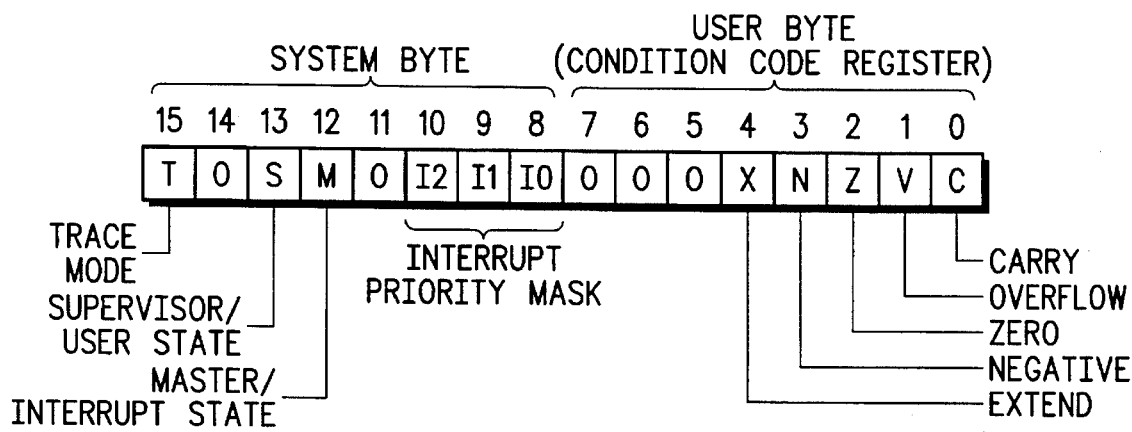
FIG. 4 illustrates, in a block diagram, a status register of the data processing system in accordance with the present invention.

FIG. 4 illustrates a status register (not illustrated in FIG. 1) which is embedded in the processor 10 of FIG. 1. The status register contains processor operational status information, some of which requires supervisor mode level of privilege to access. As a result, the Status Register is split into 2 separate bytes: a System Byte and a User Byte (also called a Condition Code Register), where supervisor mode operation can access both System and User Bytes, while user mode operation only has access to the User Byte. The specific contents of the Status Register are:

Trace (T bit)—When this bit is set at the beginning of the execution of an instruction, a trace exception will be generated when execution of the instruction is complete (unless a higher priority exception is generated). When this bit is cleared, execution proceeds normally from instruction to instruction.

Supervisor State (S bit)—When this bit is set, the data processor operates at the supervisor privilege level. When this bit is cleared, the data processor operates at the user privilege level.

Master/Interrupt State (M bit)—This is a supervisor-controlled bit that can be used to distinguish interrupt versus non-interrupt exceptions.

Interrupt Mask (I2, I1, I0 bits)—These bits form a binary code that indicates the current interrupt priority mask. Interrupt priorities are numbered from 1 (001) to 7 (111), with 7 being the highest priority. Interrupts are inhibited for all levels less than or equal to the current interrupt mask except for level 7 interrupts, which cannot be masked.

Extend (X bit)—This bit is set to the value of the Carry bit for arithmetic operations; otherwise it is not affected or it is set to a specific result by instruction execution.

Negative (N bit)—This bit is set if the most significant bit of an instruction result is set; otherwise it is cleared.

Zero (Z bit)—This bit is set if the instruction result equals zero; otherwise it is cleared.

Overflow (V bit)—This bit is set if an arithmetic overflow occurs implying that the instruction result cannot be represented in the operand size; otherwise it is cleared.

Carry (C bit)—This bit is set if carry out of the most significant bit of the instruction operand occurs for an addition, or if a borrow occurs in a subtraction; otherwise it is cleared.

0—These bits in FIG. 4 indicate a bit location which is either zero or not in use.

Figure 5:
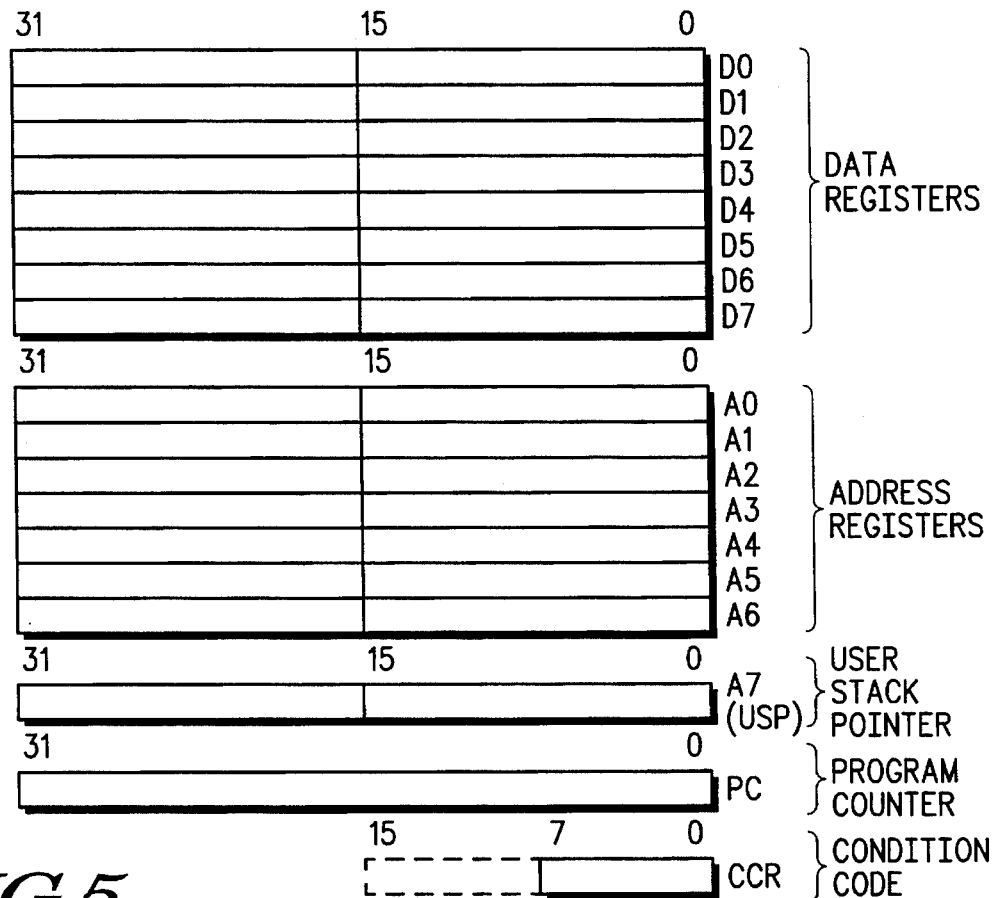
FIGS. 5, 6 and 7 each separately illustrates, in a block diagram, a programming model used by the data processing system of FIG. 1 in accordance with the present invention.

FIG. 5 illustrates an integer unit user program model which is a collection of registers internal to the processor 10 of FIG. 1. The integer unit programming model consists of the following general registers:

16 General Purpose 32-bit Registers (D7-D0, A7-A0)

1 32-bit Program Counter (PC)

1 8-bit Condition Code Register (CCR)

The Data Registers (D7-D0) can be used as operands for bit and bit field (1–32 bits), byte (8 bits), word (16 bits), long-word (32 bits), and quad-word (64 bits) operations. They can also be used as address index registers.

The Address Registers (A7-A0) can be used as software stack pointers, address index or base registers. Register A7 is used as a hardware stack pointer during stacking for subroutine calls and exception handling. In the user programming model of FIG. 5, A7 refers to the User Stack Pointer (USP) as illustrated.

The PC (program counter) contains the address of the program instruction currently executing.

The CCR (condition code register) is the Status Register's lower byte (see FIG. 4 for details of the CCR's 5 bits). Many integer instructions affect the CCR, indicating the instruction's result. Program and system control instructions use certain combinations of these bits to control program and system flow.

Figure 6:
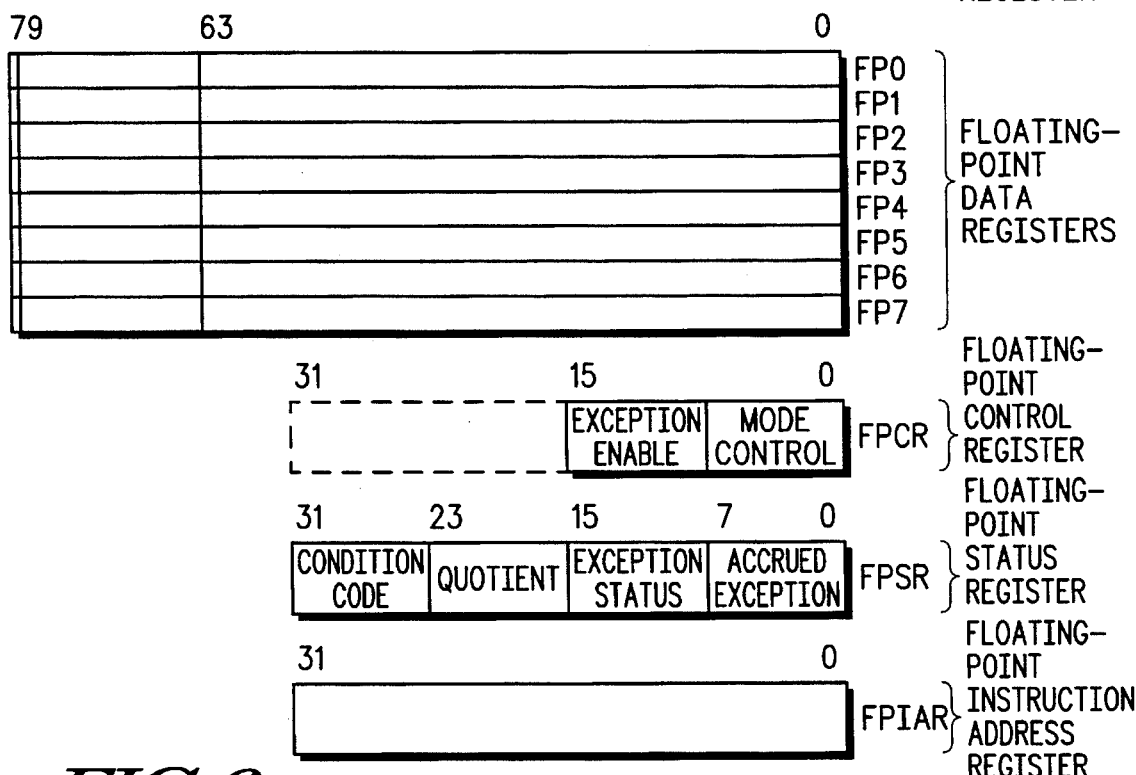

FIG. 6 illustrates a floating point user model programming model which is used in the processor 10 of FIG. 1. The floating-point unit programming model consists of the following registers which may be either centrally located or dispersed through processor 10:

8 80-bit Floating-Point Data Registers (FP7-FP0)

1 32-bit Floating-Point Control Register (FPCR)

1 32-bit Floating-Point Status Register (FPSR)

1 32-bit Floating-Point Instruction Address Register (FPIAR)

The floating-point data registers (FP7-FP0) can be used as operands for floating-point instructions. They always contain extended-precision (80-bit) numbers (all external operands are converted to extended precision prior to being loaded into a FPn wherein n is a number from 0 to 7).

The FPCR contains an exception enable byte (trap enable) and a mode (rounding and precision) control byte for user control of floating-point instruction execution.

The FPSR contains a floating-point condition code byte, a floating-point exception status byte, a quotient byte, and a floating-point accrued exception byte, all of which can be read or written by the user.

The FPIAR is loaded with the logical address of a floating point instruction before the processor executes it. The floating-point exception handler can use this address to locate the floating-point instruction if it caused an exception.

Figure 7:
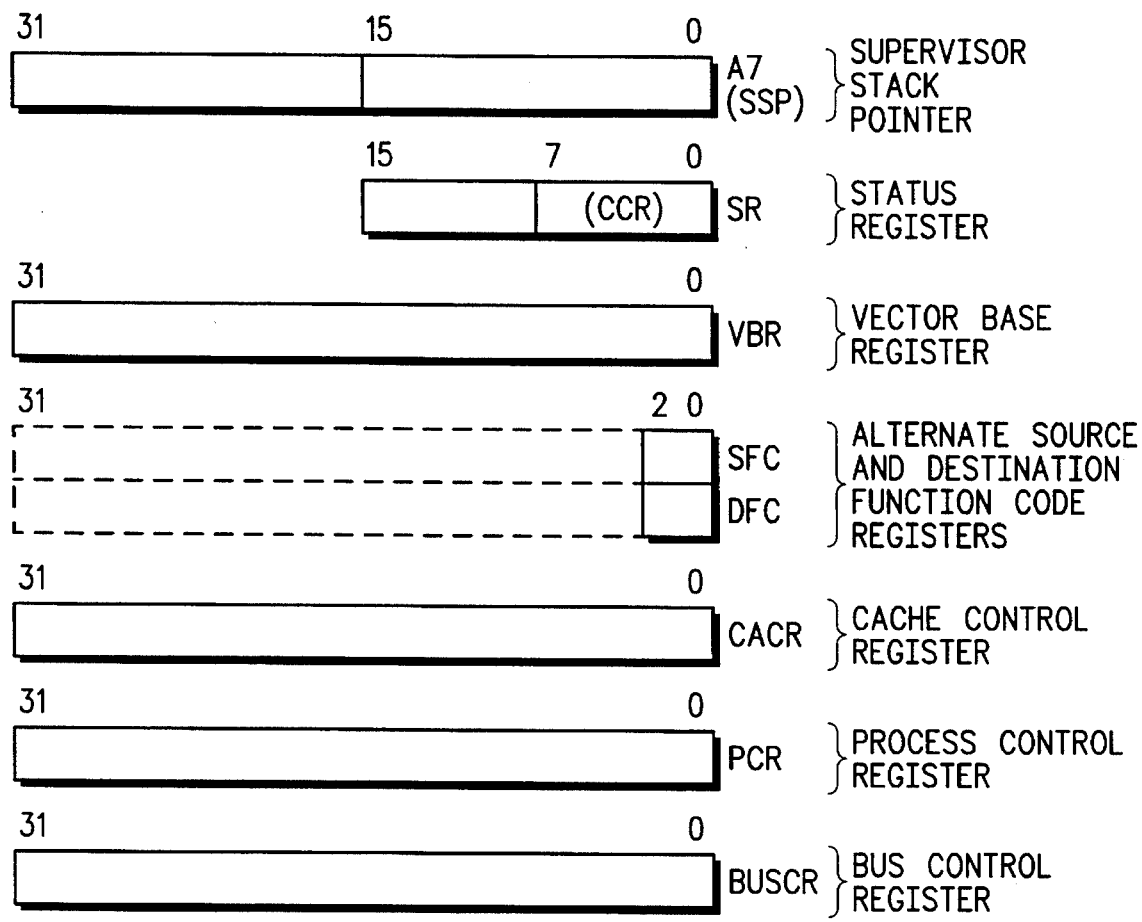

FIG. 7 illustrates a supervisor programming model which is used in the data processor 10 of FIG. 1. The supervisor programming model is provided for the implementation of operating system type functions (e.g., I/O control, memory management). User mode registers (integer and floating-point) are accessible in supervisor mode. In addition, specific supervisor-privilege-only registers make up the following programming model:

1 32-bit Supervisor Stack Pointer (A7, SSP)

1 16-bit Status Register (SR)

1 32-bit Vector Base Register (VBR)

1 3-bit Alternate Source Function Code Register (SFC)

1 3-bit Alternate Destination Function Code Register (DFC)

1 32-bit Cache Control Register (CACR)

1 32-bit Processor Control Register (PCR)

1 32-bit Bus Control Register (BUSCR)

The supervisor stack pointer (SSP) is A7 in supervisor mode. It is the hardware stack pointer for exceptions and other supervisor mode activity.

The SR contains processor operational status information (see FIG. 4 for details).

The VBR contains the base address of the exception vector table in memory.

The alternate function code registers (SFC and DFC) contain 3-bit function codes, which can be considered extensions of the 32 -bit logical address. The processor automatically generates function codes to select address spaces for data and instructions in the user and supervisor modes; certain instructions use the SFC and DFC to specify function codes for operations.

The CACR contains configuration and control information for the processor's instruction and data caches 16 and 18.

The PCR contains configuration and control information for the processor's pipeline unit 14.

The BUSCR contains control information used by the processor's bus control unit 20.

The user and supervisor programming models displayed in FIGS. 4, 5, 6, and 7, along with the user and supervisor mode contents of the memory map shown in FIG. 3, comprise the operating environment of the data processor 10. The concept of a programmer's model is needed in order to completely understand the test/debug/emulation mode discussed herein which is an architectural extension. Operation in the debug/emulator/test mode will utilize the instruction set of the data processor, but access the separate "debug mode" address spaces in the memory map of FIG. 3, for most instructions executed in debug/emulator/test mode. There is one programming model set of registers, thus instructions executed in debug/emulator/test mode can read and manipulate the registers displayed in FIGS. 5, 6, and 7. Therefore, prior to operation in debug/emulator/test mode, register contents should be saved to memory 22 to capture their original user or supervisor mode contents prior to debug/emulator/test mode operation. By performing this memory store of the programmer's model, the state of the processor in normal mode just before entrance of the test/ debug/emulation mode can be restored once the test/debug/ emulation mode is exited. Therefore the test/debug/emulation mode discussed herein is non-obtrusive and non-destructive to normal operation.

Figure 8:
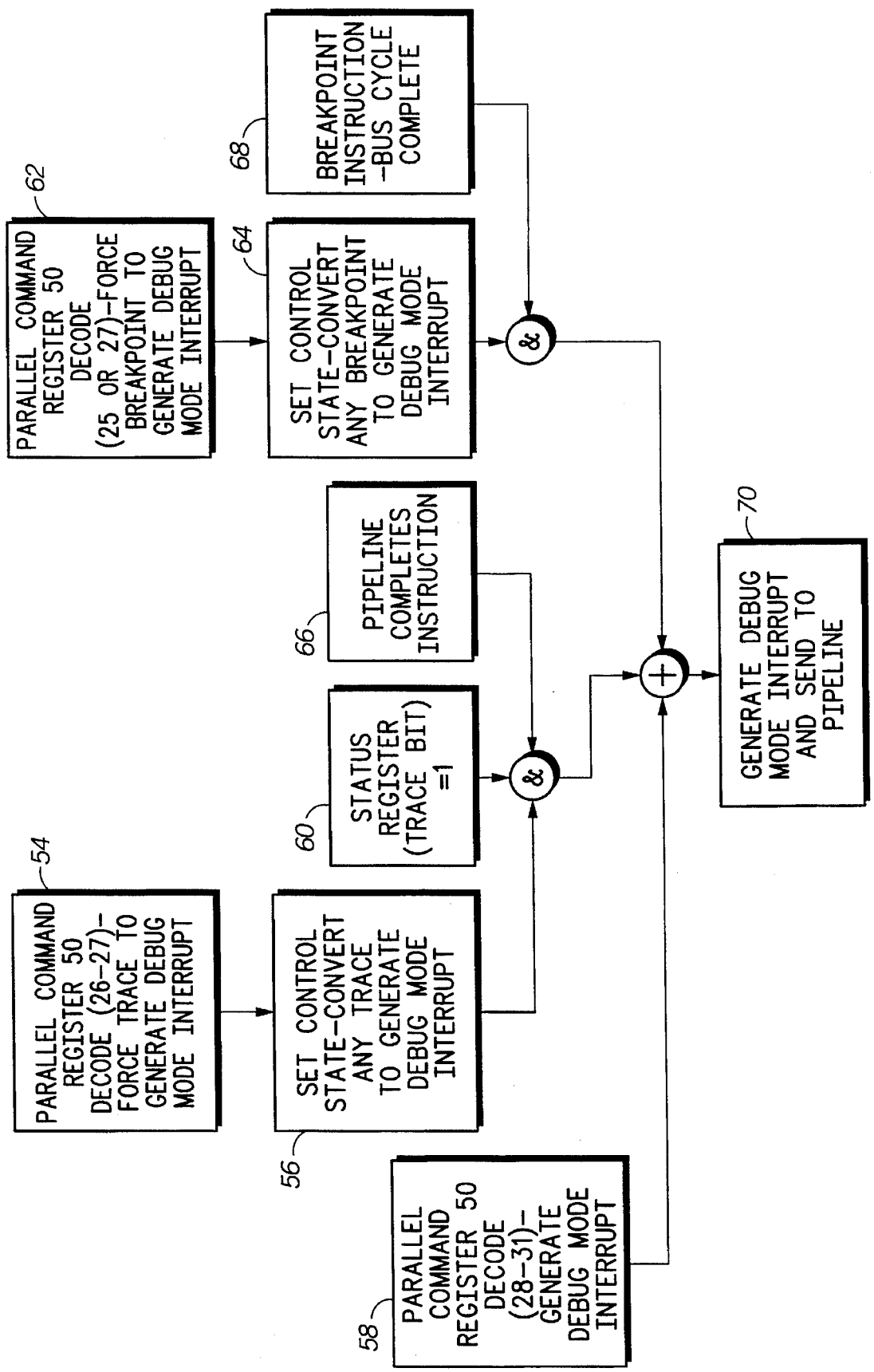
FIG. 8 illustrates, in a flowchart, several ways in which to allow the data processing system of FIG. 1 to enter a debug mode of operation in accordance with the present invention.

FIG. 8 illustrates several ways in which the debug/test/emulation mode of the processor 10 of FIG. 1 may be entered. There are three basic paths depicted in FIG. 8 for entry into debug/emulator/test mode:

1. serial shift of a "generate debug mode interrupt" (GDMI) command into the debug/emulator/test mode, test controller interface. (see text 58 in FIG. 8)

2. completion of an instruction, while the data processor is in trace mode, when the data processor is configured to convert any trace to a GDMI (generate debug mode interrupt). (see text 54, 56, 60, and 66 in FIG. 8)

3. completion of a breakpoint instruction (bus cycle complete) when the processor is configured to convert any breakpoint into a GDMI (generate debug mode interrupt). (see text 62, 64, and 68 in FIG. 8)

Each of these paths results in a "GDMI pending" condition to be signaled to the processor pipeline control logic. When the pipeline can convert control to the test/debug/emulator mode without adverse affects to normal modes of operation, then the GDMI causes the test/debug/emulator mode to be entered in a non-destructive manner as discussed herein.

Step 58 can be generated by one of four specific encodings of commands on the debug/emulator/test mode, test controller interface (described in FIG. 2 herein). These four instruction are part of the 28 instructions listed previously in reference to FIG. 2. These command encodings are serially shifted into the data processor 10 as taught herein in FIG. 2. Step 58 results in the generation of a GDMI pending condition to the processor pipeline control logic, via a step 70, which eventually allows the processor 10 to enter the test/debug/emulator mode.

Step 54 can be generated by one of two specific encodings of commands on the debug/emulator/test mode, test controller interface (these command encodings are serially shifted into the processor as discussed with reference to FIG. 2 herein). The result of step 54 is to set the "convert trace exception to GDMI pending condition" state in the processor.

Step 56 describes the configuration of a "convert trace exception to GDMI pending condition" state in the processor, initiated due to step 54.

Step 60 describes the Status Register Trace bit (see FIG. 4) being equal to a logic "1", defined as the processor being in trace mode.

Step 66 describes the processor pipeline completing the execution of an instruction. The simultaneous occurrence of steps 56, 60, and 66 (logical "and" [& in FIG. 8] of these conditions) results in the generation of a GDMI pending condition to the processor pipeline control logic and the test/debug/emulation mode is entered in processor 10.

Step 62 can be generated by one of two specific encodings of commands on the debug/emulator/test mode, test controller interface (these command encodings are serially shifted into the processor as illustrated via FIG. 2). The result of step 62 is to set the "convert breakpoint to GDMI pending condition" state in the processor.

Step 64 describes the configuration of a "convert breakpoint o to GDMI pending condition" state in the processor, initiated due to step 62.

Step 68 describes the processor completing the execution of a breakpoint instruction, which includes the completion of a breakpoint acknowledge bus cycle. The simultaneous occurrence of steps 64 and 68 (logical "and" [& in FIG. 8] of these conditions) results in the generation of a GDMI pending condition to the processor pipeline control logic and the test/debug/emulation mode is entered in processor 10.

The occurrence of any (logical "or" ["+" in FIG. 8]) of the three GDMI pending conditions listed above (step 58 or steps 56/60/66 simultaneously or steps 64/68 simultaneously) results in the initiation of step 70. Step 70 generates the GDMI pending condition and transmits it to the pipeline control logic of processor 10.

Figure 9:
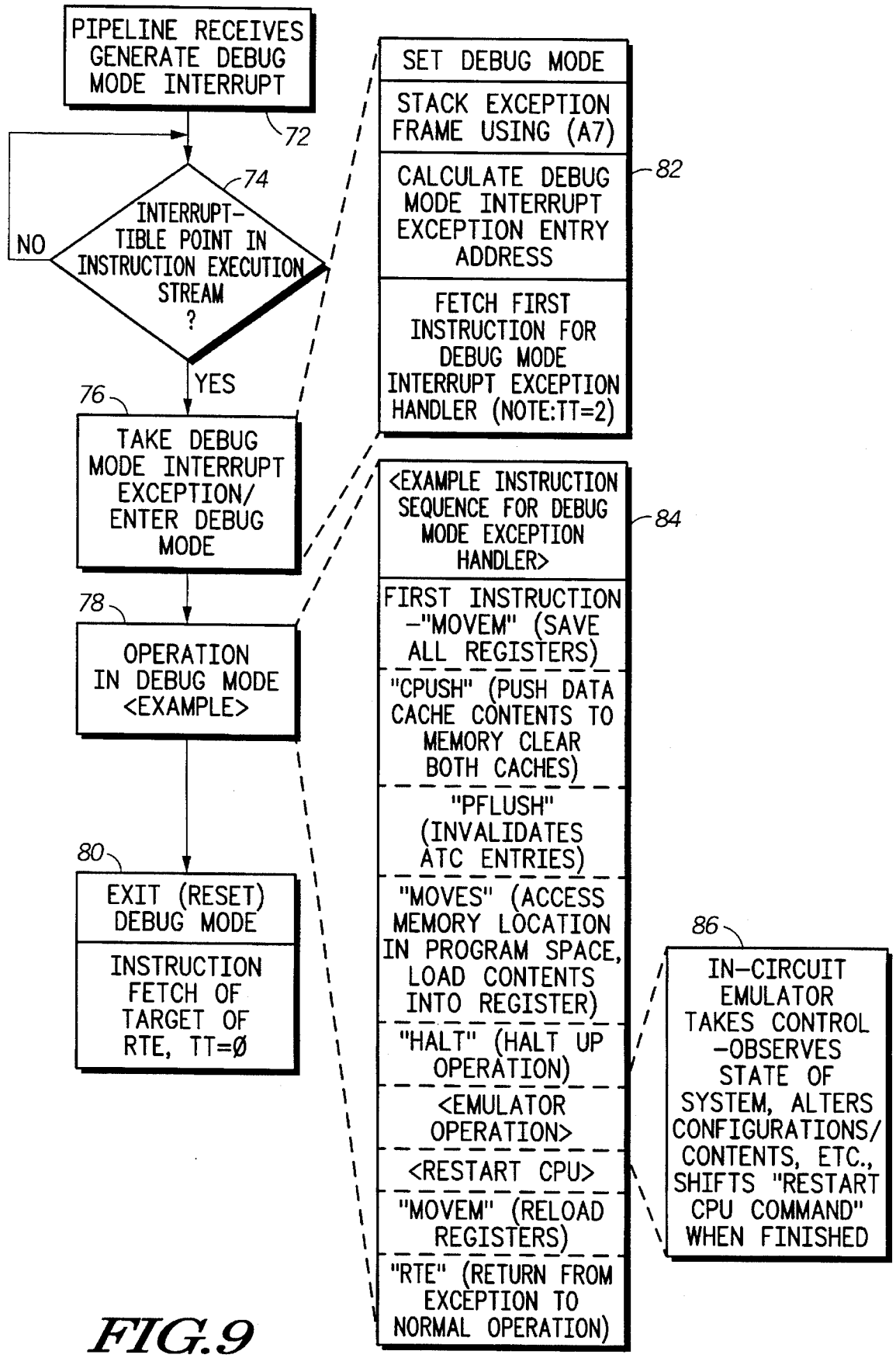
FIG. 9 illustrates, in a flowchart/block diagram, an example of the pipeline execution unit of FIG. 1 taking a debug mode interrupt exception using an in-circuit emulator in accordance with the present invention.

FIG. 9 illustrates a flowchart describing the operation of the pipeline unit 14 of FIG. 1 when taking a debug mode interrupt exception with an in-circuit emulation example. The output of step 70 (transmission of the GDMI pending condition) described in FIG. 8 is the input that initiates step 72 of FIG. 9. Step 72 describes the setting of the processor pipeline control state of GDMI pending.

Step 74 describes the identification of an interruptible point in the processor pipeline's execution of a normal instruction stream so that the GDMI exception can be processed. Interrupt pending conditions (which include GDMI pending) are converted into interrupt exceptions at interruptible points in the execution of an instruction stream, to insure that after an interrupt exception is processed by an operating system, the interrupted program can be resumed at the point of interruption without adverse affects. Step 74 is evaluated on each synchronous clock cycle the processor pipeline control state of GDMI pending is set; the two possible results of a step 74 evaluation are:

If no interruptible point on this clock cycle, the result is to return to re-evaluate step 74 on the next clock cycle; or If an interruptible point is reached on this clock cycle, the result is to proceed to step 76.

The execution of locked instructions in the unit 14 may delay entrance into the test/debug/emulation mode in order to preserve normal mode state without adverse effects.

Step 76 represents a set of actions the processor 10 takes in processing a GDMI exception (these are detailed in step 82). Part of step 76 is the actual transition from user or supervisor operating mode into the alternate processing mode, referred to herein as test/debug/emulator mode or simply test mode or debug mode.

Step 78 represents processor operation while in debug/emulator/test mode, including the execution of instructions, bus transactions, and control functions performed by the in-circuit emulator/debugger/tester 26 in FIG. 1. Steps 84 and 86 in FIG. 9 detail an example of debug/emulator/test mode processing. Note that this entire operation is controlled by the in-circuit emulator/debugger/tester 26.

Step 80 represents the exit from debug mode, which results in return to the point in the instruction stream where processing was interrupted by the GDMI in normal mode (i.e., one of either user mode or supervisor mode of operation). This is accomplished by execution of a Return from Exception (RTE) instruction at the conclusion of operation in debug mode; at the completion of the RTE, processing will resume at the PC (i.e., address) of the "next instruction" in the original interrupted instruction stream. The RTE instruction fetches its PC (program counter) destination value using the stack pointer (Address Register 7), thereby accessing the exception stack frame saved in memory for the GDMI exception, detailed in step 82, which contains the value of the "next instruction" PC address. The instruction fetch operation for the target PC address of the "next instruction" in the original interrupted instruction stream is performed as a "normal access", in user or supervisor mode, with TT=0, as described in FIG. 3. This action completes the transition out of debug mode, the debug mode state internal to the processor is reset prior to the RTE PC fetch. Normal mode (i.e., one of either supervisor mode or user mode) then continues as though the test/debug/emulation mode was never entered.

The step 82 and the steps 84 and 86 are now discussed in detail to further understand the meaning of steps 76 and 78. Step 82 details the set of actions that make up step 76, which indicates the processing of a GDMI exception. The actions involved in step 82 which further described step 76 are:

1. Set the debug mode state internal to the processor. All processing that takes place in debug mode will generate memory requests to debug memory space (TT=2, TM=5 or 6) as described in FIG. 3.
2. Build a GDMI (generate debug mode interrupt) exception stack frame (saving away contents of the PC and SR and the exception type) at the address pointed to by the stack pointer (A7). This storage references debug memory space which may be performed in external memory 22, or it may be performed elsewhere, such as in memory internal to processor 10 or other external memory to processor 10.
3. Calculate the address of the first instruction of the GDMI exception handler (this determines the contents of A[31:0] for this instruction access; TT=2, TM=6). All instruction fetch addresses generated while the processor is in test/debug/emulator mode will be to debug memory space, thus the in-circuit emulator/debugger/tester 26 controlling operation in debug mode will provide instruction data on the normal processor data bus pins, or see to it that the instruction data is provided from another source. The address for the first instruction of the GDMI exception handler is set up prior to the GDMI exception (by the in-circuit emulator/debugger/tester) by having this address written into a pre-defined GDMI exception vector location.
4. Perform the actual instruction fetch for the first instruction of the GDMI exception handler.

Steps 84 and 86 depict an example of debug/emulator/test mode operation in the processor 10. Step 84 details an instruction sequence of exception handling code for a GDMI exception handler, while step 86 represents an example operation of an in-circuit emulator wherein further instructions may be executed using the existing hardware of processor 10 and operating at the functional speed of processor 10 (which ranges from low frequencies to hundreds of MHz). As stated above, whatever operation occurs in debug/emulator/tester mode until the RTE instruction is executed, operates under the control of in-circuit emulator/debugger/tester 26 of FIG. 1 in a separate address space (see FIG. 3).

The example instruction sequence shown in step 84 includes the control operations to: (1) save the register and cache contents of the processor prior to the GDMI exception (i.e., save the normal mode of operation's state prior to executing test/debug/emulation code); (2) access program memory space while in debug/emulator/tester mode; (3) halt the processor; (4) have an in-circuit emulator serially shift commands into the processor including a restart command; (5) reload the registers from previously saved areas to restore the normal mode of operation; and (6) return from exception. In more detail, the steps identified in FIG. 9 are:

1. Execute a "MOVEM" instruction, moving all program visible registers, as identified in FIGS. 5 and 6, to memory to save the program/processor contents at the time of the GDMI exception. This is done so that the normal mode can be fully restored after testing/debugging is complete with no adverse changes.
2. Push Data Cache contents from cache 16 to memory 22 (or a like memory), via "CPUSH" instruction. The CPUSH instruction writes into memory the cache contents of cache 16 and clears all cache locations. This storing of the contents of cache 16 may be necessary to support system cache coherency if the processor is to be halted in debug mode. This storing is a capturing or a snapshot of system memory contents, including modified cache data, at the time of the GDMI exception.
3. Flush ATC (address translation cache) entries of the PMMUs (paged memory management unit) within the data cache 16 and instruction cache 18 with a "PFLUSH" instruction. The PFLUSH instruction clears descriptor contents from the ATCs. Note that the state of the ATCs does not need to be saved as is the case for data cache 16 above. This is due to the fact that once the test/debug/emulator mode is exited and normal mode restarts, the normal mode (i.e. user or supervisor mode) can recalculate the contents of the ATC with no adverse affect except for a possible speed reduction for a brief period of time while the ATC updates as normal memory address space is re-accessed.
4. Perform a "MOVES" instruction to access memory data in the original program space. A MOVES instruction executed in debug/emulator/test mode allows access to the normal memory space, either user or supervisor mode, data or instruction spaces (TT=0) as defined in FIG. 3. The ability to access user and supervisor address spaces while in test/debug/emulator mode is useful. The data contents accessed in the original program memory area are loaded into a general program visible register specified by the MOVES instruction for use during testing and/or debugging.
5. Execute a "HALT" instruction which suspends processor 10 operation. The processor 10 signals, on its bus status pins/terminals, to external bus controllers, that the halted state has been entered. This suspended state will be in force until an external command to resume processing, picking up execution from exactly where the instruction stream was halted, or a reset is received by the processor 10.
6. An in-circuit emulator/debugger/tester recognizes that the processor 10 has entered the halted state and takes control, in this example, to observe and control processor operation in an emulator mode (although various testing and debugging can also be performed). Step 86, described below, details an example of an in-circuit emulator operation, utilizing the serial shift capability to input commands and data into the processor. Testing and debugging in this mode does not have to be serially shifted into processor 10 via controller 21 (see FIG. 1), but can run instructions from test/debug address space in FIG. 3 using existing hardware of processor 10 (existing address bus, data bus, control, pipelines, caches, units, etc.) at the full speed of processor 10.
7. At the completion of in-circuit emulator or test/debug operation, the emulator restarts the halted processor from exactly where the instruction stream was halted, with a "restart the CPU" command. This command is issued to the processor 10 through the serial shift interface illustrated in FIG. 2.
8. At this point, the in-circuit emulator has completed the work it wanted to accomplish in debug/emulator/test mode, and must reload the processor's state in preparation for exit from debug/emulator/test mode. A MOVEM (move multiple) instruction is executed, this time reloading all program visible registers from the memory location described above in item #1, to restore the program contents at the time of the GDMI exception's generation.

9. The execution of an "RTE" (return from exception) instruction will complete processor operation in debug mode. Normal (user or supervisor) mode is reentered with the instruction fetch of the destination of the RTE instruction.

Step 86 depicts an example of an in-circuit emulator operation in more detail than the 7th step of step 84. In this example, the emulator observes the operational state of the processor (by reading memory locations through usage of the address and data buses of FIG. 1 [in test address space] for viewing). The emulator may also alter configurations within the processor by exercising the override disable capability discussed above, utilizing the serial shift capability of the processor 10. The emulator may modify memory contents by writing memory locations through usage of the address and data buses. At the conclusion of emulator operation, the emulator issues a "restart the CPU" command, serially shifted into the processor 10 as illustrated in FIG. 2, which invokes the processor 10 to resume operation from exactly where the instruction stream was originally halted.

Figure 10:
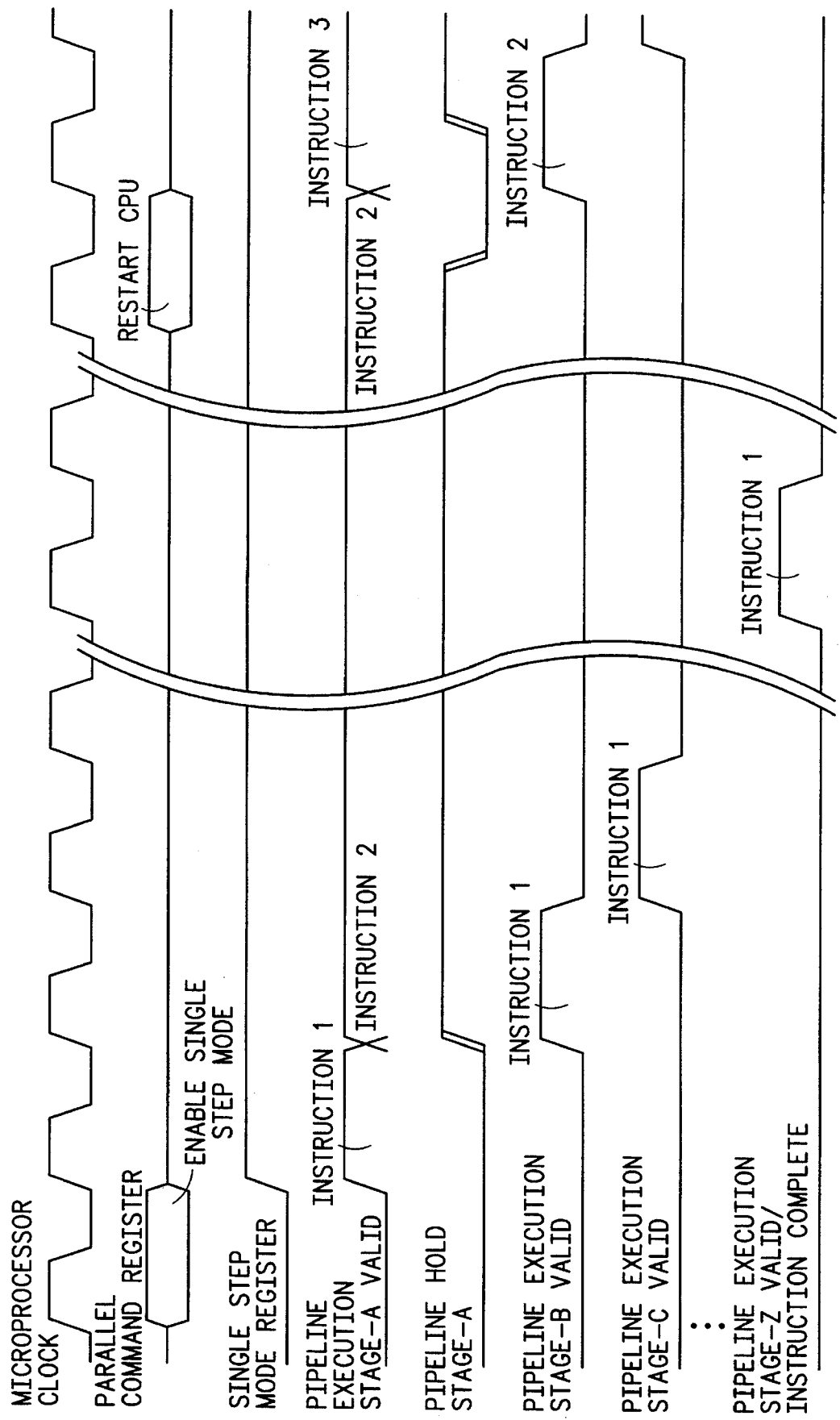
FIG. 10 illustrates, in a timing diagram, a single instruction mode of pipeline operation which is in accordance with the present invention.
Figure 11:
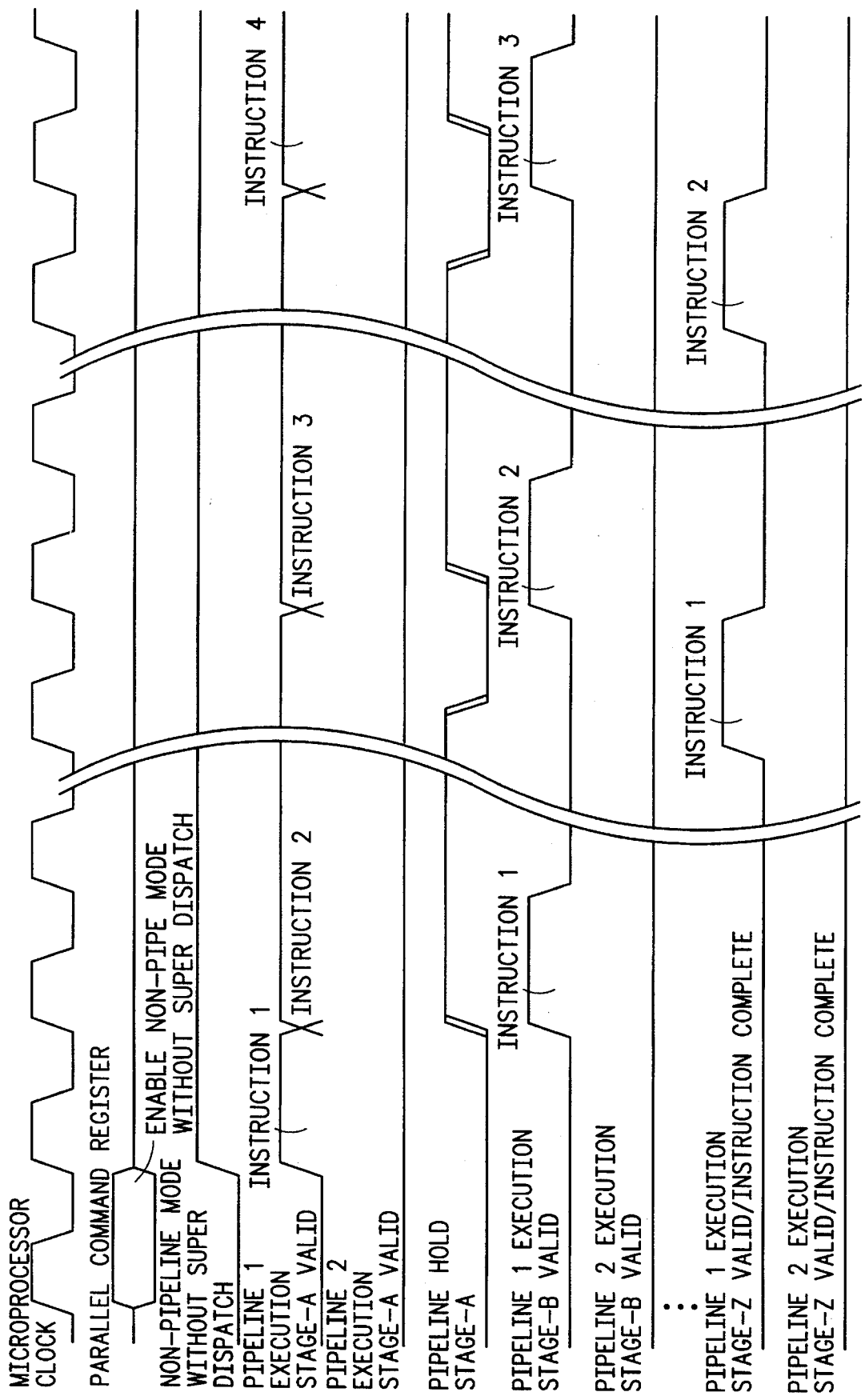
FIG. 11 illustrates, in a timing diagram, a non-pipelined instruction mode of pipeline operation without superscalar dispatch which is in accordance with the present invention.
Figure 12:
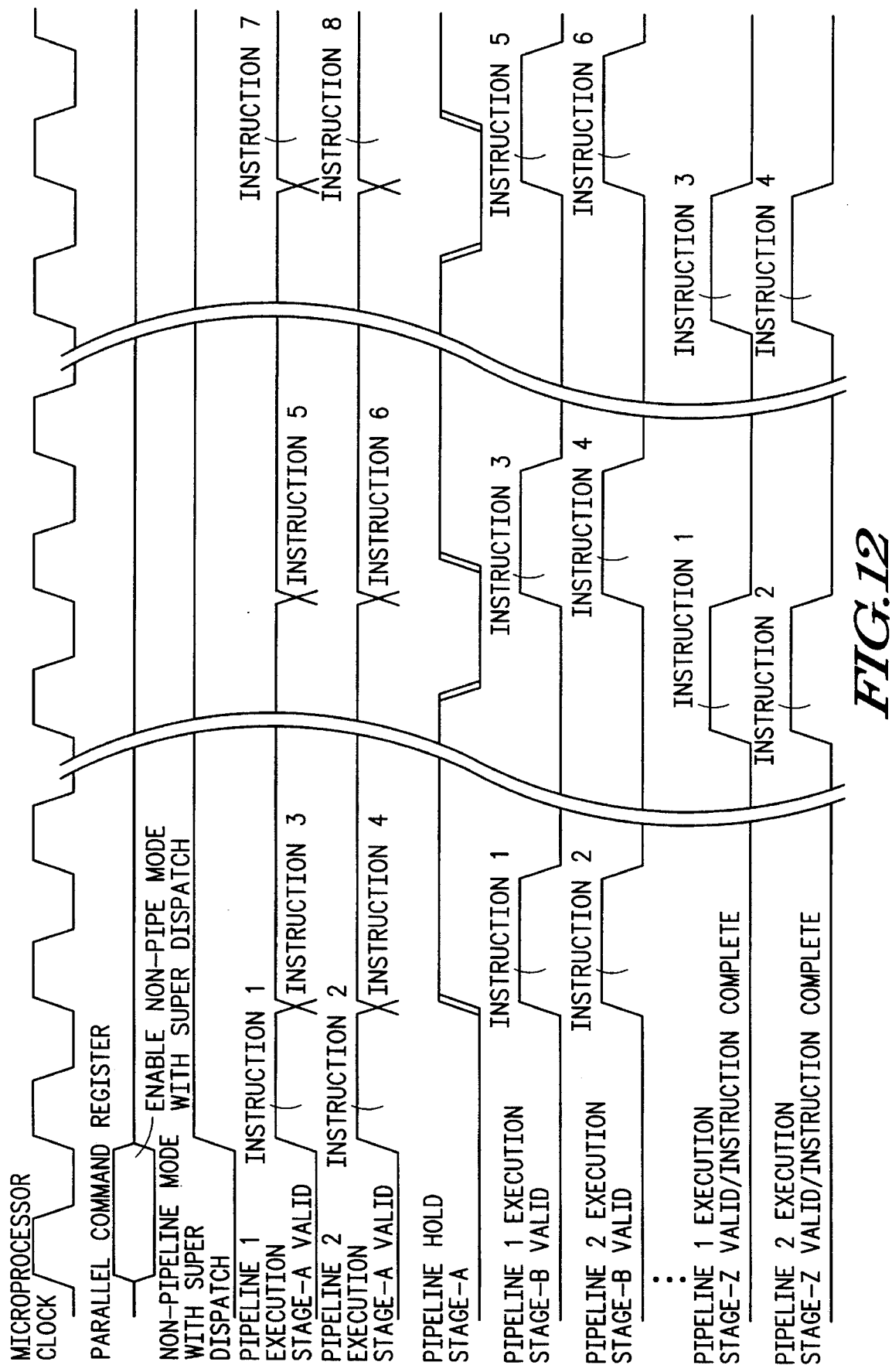
FIG. 12 illustrates, in a timing diagram, a non-pipelined instruction mode of pipeline operation with superscalar dispatch in accordance with the present invention.

FIGS. 10 through 12 illustrate various timing diagrams and signals of the processor of FIG. 1 when certain test/debug/emulation operations are being performed. FIG. 10 is a timing diagram of a single instruction mode operation. Single instruction mode is defined as a mode of operation by which the processor executes one instruction at a time, the control of which is sourced from external to the processor 10. The signals depicted in this diagram are the states and signals that control a processor pipeline's operation and the additional control states and signals that implement a single instruction mode in such a processor pipeline. The processor pipeline referred to in the diagram has sequential stages A–Z, where stage A is the first stage, stage B the second stage, and stage Z is the last pipeline stage.

The rising edge of the synchronous "microprocessor clock" signal is used by a processor to re-evaluate all internal states.

The "Parallel command register" of FIG. 10 is the parallel command register 50 of FIG. 2.

"Single step mode" is asserted based on one of the possible decoded outputs of parallel command register 50 of FIG. 2.

"Pipeline execution—stage A valid" is the control state which indicates whether or not an instruction in stage A of the pipeline is valid (logic 1=valid, logic 0=not-valid).

"Pipeline execution—stage A hold" is the pipeline control signal used to prevent, when equal to a logic 1 at the synchronous "microprocessor clock" rising edge, the "completion" of execution of an instruction for stage A of the processor pipeline. The result of stage A hold=logic 1 at the clock rising edge is that the contents of stage A valid and other stage A pipeline control state registers will not transition. If stage A hold=logic 0 at the clock rising edge, stage A valid and other stage A pipeline control state registers will transition.

"Pipeline execution—stage B valid" is the control state which indicates whether or not an instruction in stage B of the pipeline is valid (logic 1=valid, logic 0=not-valid).

"Pipeline execution—stage B hold" (not specifically illustrated in FIG. 10, but implied) is the pipeline control signal used to prevent, when equal to a logic 1 at the synchronous "microprocessor clock" rising edge, the "completion" of execution of an instruction for stage B of the processor pipeline. The result of stage B hold=logic 1 at the clock rising edge is that the contents of stage B valid and other stage B pipeline control state registers will not transition. If stage B hold=logic 0 at the clock rising edge, stage B valid and other stage B pipeline control state registers will transition.

"Pipeline execution—stage C valid" is the control state which indicates whether or not an instruction in stage C of the pipeline is valid (logic 1=valid, logic 0=not-valid).

"Pipeline execution—stage Z valid/instruction complete" is the control state which indicates whether or not an instruction in stage Z of the pipeline is valid (logic 1=valid, logic 0=not-valid). Since this is the last stage of the processor pipeline, this state indicates that the processor 10 has completed execution of an instruction.

FIG. 10 illustrates an "enable single step mode" control command being shifted into the processor 10 via the "serial shift command register". One synchronous clock cycle after the "enable single step mode" command (discussed in reference to FIG. 2) has been shifted into the processor 10, the "single step mode" decode is valid—which is the master control signal to the pipeline that indicates the pipeline is operating in a single instruction mode. In this example, "Instruction 1" is valid in stage A of the pipeline during the first clock cycle that the processor is in single instruction mode. At the next rising clock edge, Instruction 1 moves into stage B of the pipeline and "Instruction 2" becomes valid in stage A of the pipeline. During this clock cycle period, the stage A hold signal becomes a logic 1, preventing transition in stage A of the pipeline at the next rising clock edge. While in single instruction mode, the stage A hold signal will remain on (thereby stopping the progression of other instruction down the pipeline) until a command is received through the serial shift command register to indicate that the next instruction may be executed by the processor. Therefore, a true "one instruction at a time" execution control of a microprocessor by an external emulator-type controller is possible. Note that the external emulator-type controller can use the "Pipeline execution—stage Z valid/instruction complete" signal, which is typically signaled via the processor status pins/terminals, to determine when to inform the processor 10 that the next instruction may be executed by the processor 10. During this single step operation, other pipeline stages operate normally.

In FIG. 10, Instruction 1 transitions from stage B, to stage C, through the remaining pipeline stages including stage Z/instruction complete, at each synchronous clock cycle. At this point, all activity in the processor is held/suspended until a "restart CPU" command is issued to the processor through the serial shift command register interface of FIG. 2. The "restart CPU" command will result in the stage A hold signal becoming a logic 0 for one clock cycle, permitting Instruction 2 to move to pipeline stage B at the next rising clock edge. After the completion of this rising clock edge, Instruction 3 has moved into stage A of the pipeline and the stage A hold signal has again become a logic 1 to keep instruction 3 from progressing down the pipeline. This will result in Instruction 3 being held in pipeline stage A until the next restart CPU command is issued to the processor. Therefore, one instruction is processed through all stages of the pipeline while in this mode of testing/operation. Note that the wavy vertical lines in FIG. 10 indicate that some periods of time may be missing from FIG. 10 for ease of illustration.

FIG. 11 and FIG. 12 are tingling diagrams demonstrating a non-pipelined mode of operation. The definition of non-pipelined mode of operation is that only one instruction is both valid and in the process of being executed at any given clock cycle for a synchronous processor pipeline. This concept can be applied to traditional, single dispatch processors (shown in FIG. 11 ) or to superscalar dispatch processors (shown in FIG. 12). The signals in FIG. 11 and FIG. 12 are the same as FIG. 10 with the following additions:

"Non-pipelined mode without superscalar dispatch" and "Non-pipelined mode with superscalar dispatch" are two of the possible decoded outputs of parallel command register 50 of FIG. 2.

Each of the pipeline stage valid and hold signals listed in FIG. 10 are replicated in "pipeline 1" and "pipeline 2" versions of the signals in FIGS. 11 and 12. Note that the concept of superscalar architecture is not limited to two pipelines but may include any number of pipelines greater than one (i.e. three, four, six, eight, ten, sixteen, etc.)

FIG. 11 shows an "enable non-pipelined mode without superscalar dispatch" signal being shifted into the processor via the "parallel command register" 50 of FIG. 2. One synchronous clock cycle after the "enable non-pipelined mode without superscalar dispatch" command has been shifted into the processor, the "non-pipeline mode without superscalar dispatch" decode is valid—which is the master control signal to the pipeline that indicates it is operating in non-pipelined mode without superscalar dispatch. In this example. "Instruction 1" is valid in stage A of the pipeline 1 during the first cycle that the processor is in non-pipelined mode without superscalar dispatch. Note that stage A of pipeline 2 never becomes valid while operating in non-pipelined mode without superscalar dispatch. At the next rising clock edge, Instruction 1 moves into stage B of the pipeline 1 and "Instruction 2" becomes valid in stage A of the pipeline 1. During this clock cycle period, the stage A, pipeline 1 hold signal becomes a logic 1, preventing transition in stage A of pipeline 1 at the next rising clock edge. While in non-pipelined mode without superscalar dispatch, the stage A hold signal will remain on until the active instruction completes, resulting in a scenario where only one instruction is ever being processed at any given clock cycle by the processor.

In FIG. 11, Instruction 1 transitions from stage B, to stage C, through the remaining stages of pipeline 1, including stage Z/instruction complete, at each synchronous clock cycle. During the cycle which Instruction 1 completes (stage Z), the pipeline 1, stage A hold signal is driven to a logic 0, enabling the transition of the next sequential instruction into pipeline 1 at the next rising edge of the clock. Instruction 2 will then move to pipeline 1, stage B. After the completion of this rising clock edge, Instruction 3 has moved into stage A of pipeline 1 and the stage A hold signal for pipeline 1 has again become a logic 1. This will result in Instruction 3 being held in pipeline 1, stage A, until the completion of Instruction 2. In non-pipelined mode without superscalar dispatch, the valid signals for all pipeline 2 stages are driven to a logic 0. In general, FIG. 11 is similar to FIG. 10 in that only one pipeline (either pipeline 1 or pipeline 2) executes one instruction at a time, but in FIG. 11 which has multiple pipelines, the other pipeline(s) stay idle (hold asserted) while only one pipeline operates in a single-step/non-pipeline mode.

FIG. 12 shows an "enable non-pipelined mode with superscalar dispatch" signal being shifted into the processor 10 via the "parallel command register" 50. One synchronous clock cycle after the "enable non-pipelined mode with superscalar dispatch" command has been shifted into the processor 10, the "non-pipeline mode with superscalar dispatch" decode is valid—which is the master control signal to the pipeline that indicates it is operating in non-pipelined mode with superscalar dispatch. In this example. "Instruction 1" is valid in stage A of pipeline 1 and "Instruction 2" is valid in stage A of pipeline 2 during the first cycle that the processor is in non-pipelined mode with superscalar dispatch. At the next rising clock edge, Instruction 1 moves into stage B of the pipeline 1, Instruction 2 moves into stage B of pipeline 2, Instruction 3 becomes valid in stage A of the pipeline 1, and Instruction 4 becomes valid in stage A of pipeline 2. During this clock cycle period, the stage A, pipeline 1 hold and the stage A pipeline 2 signals become a logic 1, preventing transitions in stage A of both pipelines 1 and 2 at the next rising clock edge. While in non-pipelined mode with superscalar dispatch, the stage A hold signals will remain on until the active instructions complete, resulting in a scenario where only one instruction pair is ever being processed at any given clock cycle by the microprocessor.

In FIG. 12, Instruction 1 transitions from stage B, to stage C, through the remaining stages of pipeline 1, including stage Z/instruction complete, at each synchronous clock cycle and Instruction 2 transitions from stage B, to stage C, through the remaining stages of pipeline 2, including stage Z/instruction complete, at each synchronous clock cycle. During the cycle which both Instruction 1 and Instruction 2 complete (stage Z), the pipeline 1 and pipeline 2, stage A hold signals are driven to a logic 0, enabling the transition of the next sequential instruction pair (instructions 3 and 4) into the pipelines at the next rising edge of the clock. Instruction 3 will then move to pipeline 1, stage B and Instruction 4 will move to pipeline 2, stage B. After the completion of this rising clock edge, Instruction 5 has moved into stage A of pipeline 1, Instruction 6 has moved into stage A of pipeline 2, and the stage A hold signals for pipelines 1 and 2 have again become logic 1. This results in Instruction 5 being held in pipeline 1, stage A and Instruction 6 being held in pipeline 2, stage A until the completion of Instructions 3 and 4. In general, FIG. 12 illustrates that a plurality of pipelines or all pipelines can be executing instructions each in single-step/non-pipelined mode. This means that a processor with four pipelines can have two, three, or all four pipelines operating in single-step/non-pipelined mode while the other pipelines are stalled and executing no instructions. Furthermore, in another embodiment, some pipelines can be running in a full pipeline mode while other pipelines are in single-step mode while other pipelines are in a halted state and various mixtures thereof.

While the present invention has been illustrated and described with reference to specific embodiments, further modifications and improvements will occur to those skilled in the art. For example, sizes of address, data, and control buses can vary. A plurality, as used herein, is intended to mean any finite number which is greater than one and should not be limited to any particular sub-range or constant. Microprocessors may include other units besides the units presented in FIG. 1. The process of entry to and exit from debug/emulator/test mode is described here via an exception (GDMI). Entry/exit into the debug/emulator/test mode could be done via specific instruction execution, for example, or via another software or hardware method.

Observability in a debug/emulator/test mode can extend beyond the above discussed implementation (save/restore of program registers, MOVES instruction to access "normal" memory space). Additional/alternate registers could be used for the debug mode (removing need for save/restore) Also, other instructions besides MOVES could be used to access normal memory space, and internal control state registers could be observed, etc.

Controllability in a debug/emulator/test mode can be extended/changed much beyond that discussed above. For example, the test/debug/emulation mode discussed herein provides override disable of configurations (this could be enable also), and could limited instruction insertion into the pipeline for some or all processor instructions. Using a mode as discussed in this paragraph may be useful for altering internal control states and could extend to almost any possible control manipulation.

Non-pipeline mode and single instruction mode could be extended to superscalar pipelines of N depth—instruction dispatch would issue an instruction/pair of instructions/ . . . /N instructions on single dispatch for both non-pipeline and single "dispatch" modes.

The serial shift interface to the test controller is not a requirement. Other interfaces are possible (i.e., parallel shift, direct/dedicated pins, multiplexed pins, etc.). It is to be understood, therefore, that this invention is not limited to the particular forms illustrated and that it is intended in the appended claims to cover all modifications that do not depart from the spirit and scope of this invention.

What is claimed is:

1. A data processing system comprising:
a central processing unit (CPU) having a first pipelined execution unit and a second pipelined execution unit, each pipelined execution unit selectively having both (1) a normal mode of operation wherein a user programming model and user address space are accessed, via bus circuitry, to perform a predetermined function and (2) a debug mode of operation wherein a debug address space different from the user address space is accessed, via the bus circuitry used for the normal mode of operation, to perform another predetermined function, the normal mode of operation executing instructions fetched from the user address space at a predetermined rate and the debug mode of operation executing instructions fetched from the debug address space at a rate substantially equal to the predetermined rate wherein the CPU debugs the data processing system when operating in the debug mode of operation.

2. The data processing system of claim 1 wherein the data processing system has an operational state before entering the debug mode of operation wherein the debug mode of operation allows the execution of instructions in a non-destructive manner wherein the operational state of the processing system is maintained throughout the debug mode of operation.

3. The data processing system of claim 1 wherein the data processing system has an operational state which is stored in memory before entering the debug mode of operation wherein the debug mode of operation allows the execution of instructions in a non-destructive manner wherein the operational state of the processing system is restored in the data processing system after the debug mode of operation is exited.

4. The data processing system of claim 1 wherein the debug mode of operation utilizes data and address bus resources available to the data processing system when in the normal mode of operation wherein the data and address bus resources are used in a substantially similar manner regardless of whether the normal mode of operation or the debug mode of operation is functioning.

5. The data processing system of claim 1 wherein the debug mode of operation utilizes pipeline, bus interface, and cache resources available to the data processing system when in the normal mode of operation.

6. The data processing system of claim 1 wherein the debug mode of operation is allowed to selectively access the user address space in addition to the debug address space.

7. The data processing system of claim 1 wherein the debug mode of operation is allowed to selectively access at least one memory location within the user programming model in addition to being able to access the debug address space.

8. The data processing system of claim 1 wherein the data processing system has a plurality of output terminals for providing a plurality of control bits, the plurality of control bits being used to indicate what type of external bus access is to be performed external to the data processing system and which address space is to be accessed.

9. The data processing system of claim 1 wherein the data processing system comprises a logical to physical address translation cache and disables the logical to physical address translation cache when in the debug mode of operation.

10. The data processing system of claim 1 wherein the data processing system comprises at least one internal cache location for storing one or more of operands and data, the at least one internal cache location being disabled or invalidated when in the debug mode of operation.

11. The data processing system of claim 1 wherein the data processing system enters the debug mode of operation in response to an interrupt within the data processing system.

12. The data processing system of claim 11 wherein the interrupt is generated by a reset of the CPU.

13. The data processing system of claim 11 wherein the interrupt is generated by a plurality of control bits serially shifted into the data processing system and communicated to the CPU.

14. The data processing system of claim 11 wherein the interrupt is generated in response to both a breakpoint instruction executed within the CPU and an asserted control bit.

15. The data processing system of claim 11 wherein the interrupt is generated in response to both an asserted trace control bit and an asserted program control register bit.

16. The data processing system of claim 1 wherein the debug mode of operation is allowed to both write and read information from both the user address space and at least one register within the user programming model.

17. The data processing system of claim 1 wherein the data processing system can selectively disable, when the data processing system is operating in the debug mode of operation, one circuit selected for a group consisting of: a floating point unit within the data processing system, a branch cache within the data processing system, a write buffer within the data processing system, a superscalar dispatch circuit within the data processing system, an address translation cache (ATC) within the data processing system, an instruction cache within the data processing system, and a data cache within the data processing system.

18. The data processing system of claim 1 wherein the data processing system has a terminal for receiving one or more serially-communicated instructions to be communicated to the CPU during the debug mode of operation.

19. The data processing systems of claim 18 wherein the one or more serially-communicated instructions is at least one instruction selected from a group consisting of: an instruction which is used to invalidate a cache internal to the data processing system, an instruction which is used to flush at least one cache internal to the data processing system, and an instruction which is used to perform a cache push operation for at least one cache within the data processing system.

20. The data processor of claim 1 wherein the CPU is a pipelined CPU.

21. The data processor of claim 20 wherein the CPU has a control bit which, when asserted, allows the CPU to run in a non-pipelined mode of operation.

22. The data processor of claim 21 wherein the CPU is a superscaler architecture having more than one pipeline unit operating in parallel and has a single instruction step mode of debugging wherein one instruction is executed at a single point in time.

23. The data processing system of claim 1 wherein the data processing system can be programmed to tri-state a plurality of output terminals and ignore a plurality of input terminals when in the debug mode of operation.

24. The data processing system of claim 23 wherein a debug controller external to the data processing system may be used to perform bus operations when the plurality of output terminals is tri-stated.

25. The data processing system of claim 1 wherein the data processor is capable of entering a halt mode of operation.

26. A data processor comprising:
a plurality of terminals for communicating control information, data bits, and address bits external to the data processor and receiving control information and data bits from external to the data processor;
a bus interface unit coupled to the plurality of terminals;
a data cache coupled to the bus interface unit for storing data received via the plurality of terminals;
an instruction cache coupled to the bus interface unit for storing instructions received via the plurality of terminals;
an instruction prefetch unit for receiving instructions from the instruction cache and providing control signal outputs; and a first pipelined execution unit and a second pipelined execution unit for receiving data from the data cache and receiving the control signal outputs from the instruction prefetch unit and executing a plurality of instructions using data from the data cache, each pipelined execution unit selectively having both a normal mode of operation wherein a user programming model and user address space are accessed to perform a predetermined function and a debug mode of operation wherein a debug address space different from the user address space is accessed to perform another predetermined function, the normal mode of operation executing instructions fetched from the user address space at a predetermined frequency, the instructions being provided via the plurality of terminals, the debug mode of operation executing instructions fetched from the debug address space at a frequency substantially equal to the predetermined frequency.

27. The data processor of claim 26 further comprising:
external memory coupled to the plurality of terminals, the external memory having a portion which is defined as user address space for use in the normal mode of operation and default address space different from the user address space for use during the debug mode of operation.

28. The data processor of claim 26 wherein the pipelined execution unit has a first pipeline unit and a second pipeline unit wherein both pipeline units execute processor instructions.

29. A data processor comprising:

a plurality of terminals used for receiving data and instructions from external to the data processor, the data and instructions being normal data and instructions if read from a first address space external to the data processor and being debug data and instructions if read from a debug address space;
a central processing unit (CPU) within the data processor and coupled to the plurality of terminals, the CPU having a first pipelined execution unit and a second pipelined execution unit, each pipelined execution unit selectively having both a normal mode of operation wherein a user programming model and the first address space are accessed to perform a predetermined function and a debug mode of operation wherein the debug address space accessed during the debug mode of operation is different from the user address space and is accessed to perform another predetermined function, the normal mode of operation executing instructions fetched from the user address space at a predetermined rate and the debug mode of operation executing instructions fetched from the debug address space at a rate substantially equal to the predetermined rate, the debug mode of operation operating in a non-destructive manner wherein the instructions and state associated with the user address space is not adversely altered via the debug mode of operation.

30. The data processor of claim 29 wherein the non-destructive manner of operation is further accomplished by storing a user programmers model associated with the user address space to memory when debug mode of operation is entered and restoring the user programmers model from memory to the data processor when the debug mode of operation is terminated.

31. An integrated circuit data processor comprising:
a first pipeline execution unit having a normal mode of operation for executing normal instructions at an execution speed and having a normal mode state while executing, a debug mode of operation which is selectively set to execute the normal instructions at a speed substantially equal to the execution speed to test the integrated circuit data processor for proper functioning while the normal mode state is preserved, and a plurality of execution stages;
a second pipeline execution unit having a normal mode of operation and a debug mode of operation, and a plurality of execution stages; and
circuitry which allows the first pipeline execution unit to selectively execute instructions in a non-pipelined manner wherein only one instruction at a time is allowed to be transferred through more than one execution stage in the plurality of the execution stages of the first pipeline execution unit.

32. The integrated circuit data processor of claim 31 wherein the second pipeline execution unit has circuitry which allows the second pipelined execution unit to selectively execute instructions in a non-pipelined manner.

33. The integrated circuit data processor of claim 31 wherein the first pipeline execution unit is executing instructions in a pipelined manner and the second pipeline execution unit is operating in an idle state wherein no instructions are being executed.

34. The integrated circuit data processor of claim 31 wherein the first pipeline execution unit is executing instructions in a single-step non-pipelined manner and the second pipeline execution unit is in an idle state wherein no instructions are being executed.

35. The integrated circuit data processor of claim 31 wherein the first pipeline execution unit is executing instructions in a single-step non-pipelined manner and the second integrated circuit is executing instructions in a pipelined manner.

36. The integrated circuit data processor of claim 31 wherein the first pipeline execution unit may be operated in a single step debug mode wherein only one instruction is executed by the first pipeline execution unit at a time and the debug mode of operation is entered after the execution of every instruction.

37. An integrated circuit data processor comprising:

a first pipeline execution unit having a normal mode of operation and a debug mode of operation;

a second pipeline execution unit having a normal mode of operation and a debug mode of operation, the second pipelined execution unit having both the normal mode of operation wherein a user programming model and user address space are accessed to perform a predetermined function and the debug mode of operation wherein a debug address space different from the user address space is accessed to perform another predetermined function, the normal mode of operation executing instructions fetched from the user address space at a predetermined rate and the debug mode of operation executing instructions fetched from the debug address space at a rate substantially equal to the predetermined rate; and circuitry for selectively tri-stating at least one output terminal of the data processor so that an external debug circuit can perform bus operations when the integrated circuit data processor is operating in the debug mode of operation.

38. The data processing system of claim 1 wherein the normal mode of operation executes instructions from a normal mode instruction set and wherein the debug mode of operation executes the instructions from the normal mode instructions set.

39. A method for operating a debug mode in a super scalar data processing system:

placing a first pipelined execution unit in a normal mode of operation wherein user instructions are read from user memory space and executed at a predetermined pipeline speed;

placing a second pipelined execution unit in the normal mode of operation wherein user instructions are read from user memory space and executed at the predetermined pipeline speed along with execution by the first pipeline unit;

placing the first pipeline unit into a debug mode of operation wherein the debug instructions are read from debug memory space and executed, the debug mode of operation of the first pipeline unit being operational while the second pipeline unit maintains the normal mode of operation; and returning the first pipeline unit to the normal mode of operation once the debug mode of operation is complete.

40. The method of claim 39 wherein the step of placing the first pipeline unit into a debug mode of operation comprises:

reading debug and user instructions are read using the same bus controller and same address/data busses where debug instruction run at the predetermined pipeline speed.

41. The method of claim 39 wherein the step of placing the first pipeline unit into a debug mode of operation comprises:

reading debug and user instructions are read using the same bus controller and same address/data busses where debug instruction run at a speed lower than the predetermined pipeline speed due to non-pipelined debug execution in the first pipeline unit.

42. The method of claim 39 wherein the step of placing the first pipeline unit into a debug mode of operation comprises:

reading debug and user instructions wherein the debug and user instructions are both selected from a substantially similar instruction set so that the debug mode of operation was a same level of functionality as the normal mode of operation.

* * * * *